3,190,826
COMPARISON AND DERIVATION ELECTRODE FOR POTENTIOMETRIC MEASUREMENTS
Hermann Fricke, Mainz-Mombach, Germany, assignor to Jenaer Glaswerk Schott & Gen., Mainz, Germany, a German corporation
Filed Jan. 19, 1960, Ser. No. 3,376
Claims priority, application Germany, Feb. 5, 1959, J 15,978
1 Claim. (Cl. 204—195)

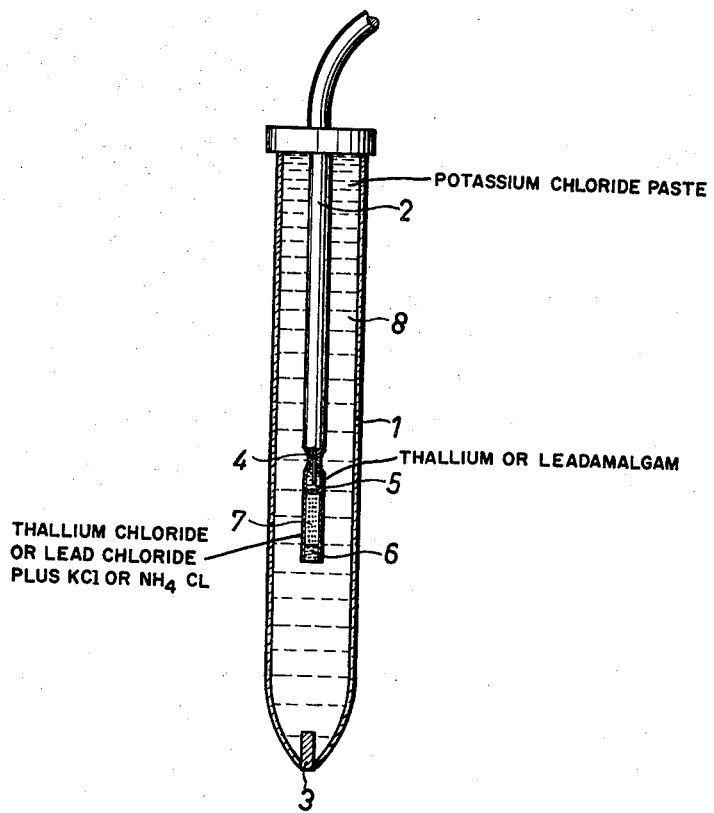

The present invention relates to a comparison and derivation electrode for potentiometric measurements, and particularly for pH measurements by means of glass-electrode measuring cells.

In all pH measurements which are carried out at higher temperatures, it is one of the greatest difficulties to obtain a suitable reference electrode. The only reference electrode which has previously proved of practical value is a saturated calomel and silver chloride electrode. Such electrodes are made in accordance with the following structure: $Hg//Hg_2Cl_{2sat.}, KCl_{sat.}$ or $Ag//AgCl_{sat.}, KCl_{sat.}$. They are therefore electrodes of the second type. However, while a calomel electrode may be applied only to a limited extent and at best up to 80° C. because of disproportioning of the calomel at higher temperatures according to the equation $$Hg_2Cl_2 = Hg + HgCl_2$$

and because the reverse reaction of the disproportioning proceeds only very slowly, a silver chloride electrode is applicable in principle at high temperatures. The usual glass electrode measuring cells which are used for higher temperatures therefore contain a silver chloride electrode as a reference and derivation electrode. However, even a silver chloride electrode is very unsatisfactory for the following reasons:

In order to avoid liquid junction potentials and to attain a defined silver chloride ion concentration, it is necessary to work with saturated KCl solutions in the reference electrode. However, the silver chloride is considerably soluble already at 100° C. in saturated potassium chloride solutions. The life of these electrodes is therefore rather short since the silver chloride which is applied on the silver wire gradually dissolves therefrom. The attempts to prevent this by applying the silver chloride in a thick, solid layer by immersion into molten AgCl lead to another, very serious disadvantage. The size of the potential will then be very unreliable. The silver chloride electrodes thus produced not only differ from each other in their potential by as much as ±10 mv., but even the individual electrodes show a slightly varying potential over a period of time. This variation may amount in some electrodes to as much as ±5 mv., and the errors caused thereby may therefore amount to a total of more than 20 mv.

In order to prevent these errors, an electrode has been proposed in which the electrode material consists of silver in combination with silver acetate. Such an electrode has, however, also the following very serious disadvantages:

(1) Due to the solubility of the silver acetate which is very considerable even at 100° C., the silver acetate contained in the cartridge diffuses very quickly therefrom. The electrode has therefore not a very long life at higher temperatures. This effect may be even increased by the increase of the solubility of the solid silver acetate by sodium acetate.

(2) In place of potassium chloride as commonly used in the calomel and silver chloride electrodes, this electrode uses sodium acetate as the salt which determines the potential. However, since the sodium ion and the acetate ion differ in their electrical mobility by about 20%, a very considerable liquid junction potential will necessarily result on the diaphragm.

When testing systematically whether an electrode complies with the condition required of a comparison electrode that it operates accurately at higher as well as at low temperatures, the following has been found:

(1) The accuracy of the calomel electrode depends essentially upon the liquid condition of the metal which is used for producing the potential. While the use of solid metals may very easily cause interferences due to internal stresses within the metal, tenaciously adhering surface coatings, and the like, the equilibrium which determines the potential may with liquid metals be attained and reattained much more quickly since two liquid phases border on each other which have a common surface which may be very quickly renewed from both sides by diffusion. It therefore appeared desirable to operate with a liquid metal as used in the mercury electrode.

(2) In order to maintain the liquid junction potential on the diaphragm as small as possible, the salt determining the potential is usually provided with a solid phase in the form of a so-called salt of the salt bridge which should be of a high concentration and have the property that the cations and ions have substantially the same mobility so as to be able to keep the liquid junction potential as small as possible. In view of these two conditions, the salts of the salt bridge to be considered of practical value for the mentioned purpose are: KCl, $KNO_3$, $NH_4Cl$, $NH_4NO_3$.

However, since the potential-determining salt should, on the one hand, have the anion in common with the salt of the salt bridge (electrode of the second type), while, on the other hand, the solubility of the potential-determining salt should be as small as possible, there only remains the possibility to choose a difficulty soluble chloride as the potential-determining salt since there are hardly any nitrates known which are difficultly soluble.

It has now been found according to the present invention that an electrode will comply with all of the necessary requirements in which the electrode metal consists of liquid thallium amalgam or lead amalgam, the potential-determining salt consists of thallium chloride or lead chloride, and the salt of the salt bridge preferably consists of potassium chloride.

Measurements on thallium amalgam electrodes according to the invention in contact with solutions which were saturated in thallium chloride and potassium chloride showed that such electrodes operate very reliably and accurately insofar as the potential adjustment is concerned as well as at higher temperatures up to 135° C. The thallium amalgams showed the additional advantage that the range of the alloy of thallium and mercury, which is liquid at room temperature, extends from about 0 to 40 percent by weight of thallium. For this reason, a considerable amount of scientific research has been expended regarding thallium amalgam electrodes, especially around the turn of the century. This research was carried out, however, for the sole purpose of attaining electro-chemical thermo-dynamic or metallurgical measuring data since on the basis of the electro-chemical properties of these alloys which are liquid at room temperature it is possible to ascertain definite information of their thermo-dynamic values. However, no effort was made to utilize the thallium amalgam electrodes to produce a reference electrode, for example, for pH measurements.

Of course, the potential is also dependent upon the concentration of the thallium metal in the amalgam. However, the measurements which were carried out with thallium concentrations of 0.1 to 40 percent by weight showed that the potential occurred at an equal precision regardless of the degree of concentration in thallium. The electrodes which were made of a 40% amalgam also showed the following additional, very important advantages.

The variation of the potential with the temperature between 20 and 100° C. amounted to only 7 mv. and practically occurred just as quickly as the change in temperature in the electrode. Hysteresis phenomena, that is, a lagging of the potential behind the cooling curve of the electrode, were not ascertained. This is also a requirement made upon glass electrodes which are applied in the pH measuring art. Thallium amalgam electrodes which were applied in a continuous test at temperatures up to 100° C. still showed after six weeks the same potentials as at the beginning of the test.

The lead amalgam electrodes according to the invention also proved to be very useful, although the range of the alloy which is liquid at room temperature extends in the phase diagram of lead and mercury only up to about three percent by weight of lead. The thallium amalgam electrodes therefore proved to be better, although for special purposes lead amalgam electrodes may be applied very successfully.

A preferred embodiment of a reference electrode according to the invention is illustrated diagrammatically in the accompanying drawing, in which 1 indicates a tubular electrode shaft into which a cable 2 is inserted from above and a diaphragm 3 from below. A fused-in platinum wire 4 connects a capsule 5 containing the thallium amalgam with cable 2. A cartridge 7 which is closed at its lower end, for example, by a wad of cotton 6, contains a mixture of thallium chloride and potassium chloride. The free space surrounding cable 2 and the other parts within the tubular shaft 1 is filled with a paste of potassium chloride.

As previously described, the thallium amalgam in capsule 5 may also be replaced by lead amalgam, and the thallium chloride in the mixture with potassium chloride in cartridge 7 may be replaced by lead chloride. Furthermore, the potassium chloride may be replaced by ammonium chloride.

Although my invention has been illustrated and described with reference to the preferred embodiments thereof, I wish to have it understood that it is in no way limited to the details of such embodiments, but is capable of numerous modifications within the scope of the appended claim.

Having thus fully disclosed my invention, what I claim is:

A standard electrode for use in electrometric devices for making potentiometric measurements, comprising a first container, a second container disposed within said first container in spaced-apart relationship thereto, subdivided into first and second communicating sections including in said first section a thallium amalgam having a thallium concentration of 40% by weight as electrode metal, a salt mixture for determining the potential of the electrode consisting of thallium chloride and potassium chloride in said second section and electric current conducting means extending into the first container to a location within the first section of said second container.

References Cited by the Examiner

UNITED STATES PATENTS 3,000,804    9/61    Cahoon et al. _____ 204—195

FOREIGN PATENTS 939,597    2/56    Germany.
729,575    5/55    Great Britain.

OTHER REFERENCES

Gerke: "Physical Review," vol. 1, January 1925, pages 377–395.

Krefeld, German application Serial No. F9115, printed Sept. 15, 1955.

Le Baron et al.: "Transactions, Electro Chemical Society," vol. 79 (1941), pages 155–162.

Richards et al.: Zeit. Phys. Chem., vol. 72 (1909), pages 129 and 165.

Trans. of Amer. Electrochemical Soc., vol. 22, 1912, pp. 335–343.

WINSTON A. DOUGLAS, *Primary Examiner.*

JOSEPH REBOLD, JOHN R. SPECK, MURRAY TILLMAN, *Examiners.*